Sept. 23, 1958 A. T. FUSCHI 2,853,312
TRACTOR-TRAILER SAFETY LOCK MEANS
Filed Sept. 26, 1955
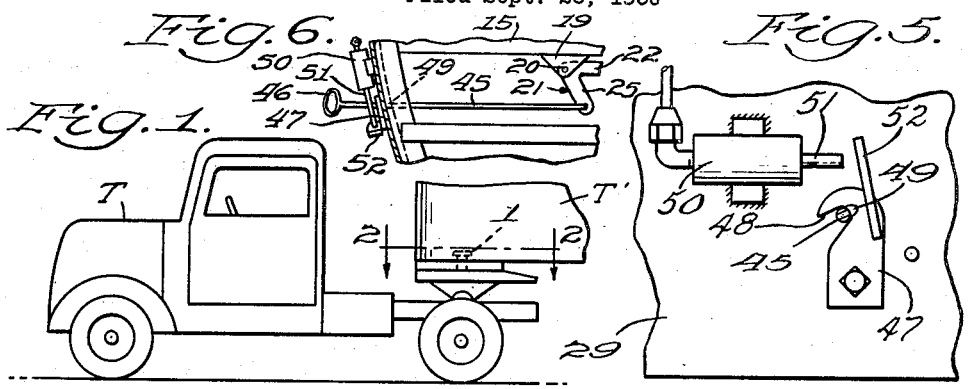
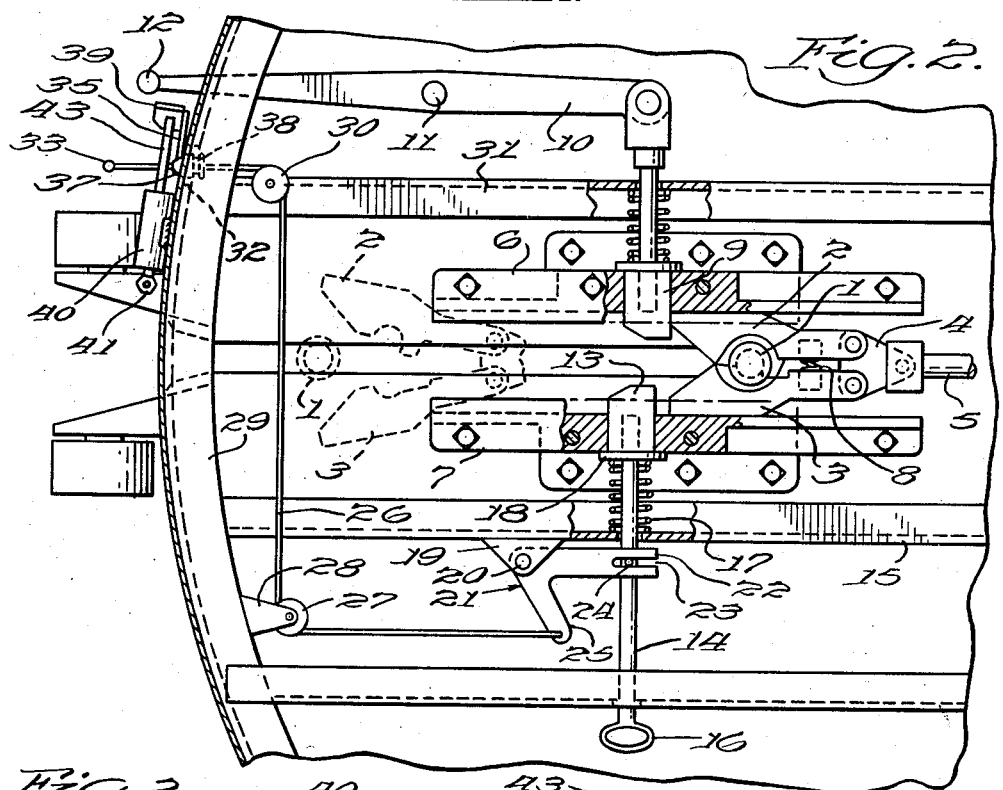
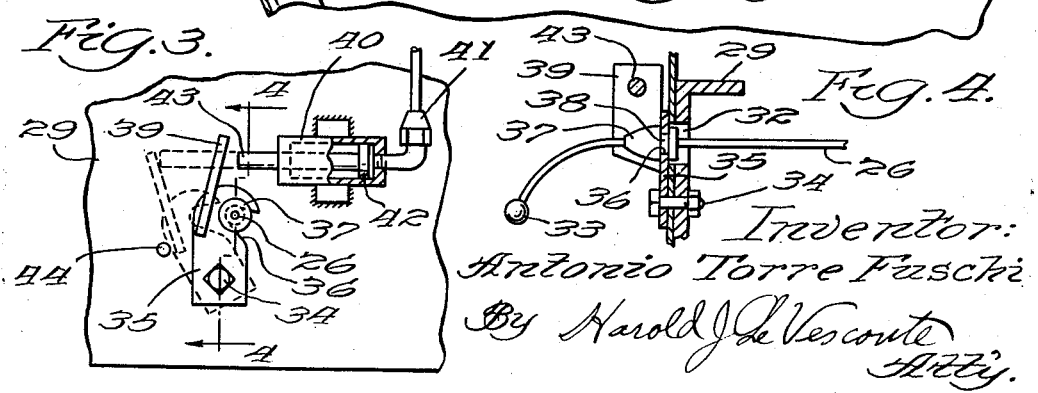
Inventor:
Antonio Torre Fuschi
By Harold J. LeVescoute
Atty.

2,853,312
TRACTOR-TRAILER SAFETY LOCK MEANS

Antonio Torre Fuschi, Los Angeles, Calif.

Application September 26, 1955, Serial No. 536,610

4 Claims. (Cl. 280—432)

This invention relates to coupling means for tractors and trailers and more particularly to a safety means therefor, constituting an improvement over that which forms the subject matter of my co-pending application Serial No. 380,913, filed September 18, 1953, now Patent No. 2,730,377.

The principal object of the invention is to provide a safety lock means for preventing accidental release of the king pin of the tractor component of the coupling means with a lesser degree of king pin travel than obtained in the structure described and claimed in my said co-pending application.

Another object of the invention is to provide a safety lock means of the above character which can be installed for operation from either side or from both sides of the trailer component and which is simple in construction, is readily installed on existing equipment, and which is reliable for its intended purpose.

With the foregoing objects in view, together with such additional objects and advantages as may subsequently appear, the invention resides in the parts, and in the construction, combination and arrangement of parts described, by way of example, in the following specification of certain presently preferred modes of execution of the invention; reference being had to the accompanying drawings which form a part of said specification and in which drawings:

Fig. 1 is a side elevation of a coupled tractor and trailer in which the present invention is incorporated, Fig. 2 is an enlarged scale, partially sectional, plan view taken substantially on the line 2—2 of Fig. 1

Fig. 3 is a front elevation of the brake system operated release for the safety lock means, Fig. 4 is a sectional view taken on the line 4—4 of Fig. 3 and Fig. 5 is a view similar to Fig. 3 but showing the alternative form of the invention indicated by broken lines in Fig. 2, and Fig. 6 is a fragmentary, top plan view showing the mode of installation and operation of the device in the form thereof shown in Fig. 5.

Referring to the drawings the invention relates to a tractor and trailer coupling means by which a tractor T is releasably connected to a trailer T'; said means including a king pin 1 carried by the tractor and releasable king pin engaging jaws 2 and 3 carried by the framework beneath the front end of the trailer. The jaws 2 and 3 are pivotally connected to a head 4 carried by a spring biased bar 5 and are slidably mounted in a guideway comprising rails 6 and 7 extending longitudinally of the centerline of the trailer; said jaws on their opposed faces having complementary semi-circular recesses for reception of the king pin and being urged away from each other by a compression spring 8. When the jaws are brought beyond the front end of the guideway to the limit permitted by the rod 5, the spring 8 spreads them apart about their pivots as indicated in broken lines with resultant release of the king pin. When engaged with the king pin the jaws are prevented from moving out of the guideway by a spring biased latch bolt 9 which normally projects across the guideway from one side thereof and which is connected to one end of a hand lever 10 which is pivoted between its ends to the under side of the trailer at 11 and which terminates in a handle portion 12 projecting beyond the front end of the trailer at one side thereof. All of the foregoing is structure with which the present invention is incorporated and forms no part of the present invention.

The present invention is concerned with a second or safety locking means including means for releasably latching said safety lock in released or unlocked position and devices for disabling said latching means upon application of pressure to the braking system of the vehicle to insure the movement of said safety means into the path of movement of the jaws and king pin with resultant assurance that should the primary latch bolt means fail, the secondary locking means will remain effective to prevent release of the king pin by the jaws. This safety locking means includes a latch bolt 13 which is slidably mounted in the rail 7 slightly forwardly of the position of the latch bolt 9. The latch bolt 13 is carried by a rod 14 which extends from the latch bolt through a member 15 of the trailer frame and terminates in a handle portion 16 adjacent the side of the trailer. A compression spring 17 surrounds the rod 14 and reacts between the side of the member 15 and a washer 18 at the outer end of the latch bolt to urge the latch bolt into locking position; the washer 18 additionally serving to limit the extent of movement of the latch bolt into the path of the jaw 3. The outer face of the frame member 15 carries a bracket 19 disposed forwardly of the rod 14 and which carries a pivot pin 20 on which a bellcrank 21 is mounted for oscillation. An arm 22 of the bell crank extends rearwardly generally parallel to the outer face of the frame member 15 immediately above the rod 14 and is provided with a slot 23 in which a pin 24 extending upwardly from the rod 14 is received. The other arm 25 of the bellcrank extends laterally and slightly diagonally rearwardly and the distal end thereof is connected to one end of a cable 26 which extends therefrom first forwardly to and around a sheave 27 carried by a bracket 28 projecting rearwardly from the rear face of the trailer front frame member 29, thence transversely of the trailer to and around a second sheave 30 carried by a trailer frame member 31 and thence forwardly through an opening 32 in the front frame member 29 (see Fig. 4) and terminating in a knob end 33 exteriorly thereof.

The front face of the trailer frame member 29 below the opening 32 therethrough, carries a bolt 34 on which a latch 35 is pivotally mounted; said latch being relatively thin and having a notch 36 formed in one edge thereof and being movable over the opening 32. Fixed to the cable 26 adjacent the end which protrudes through the opening 32 is a collar 37 having a peripheral groove 38 in which the notch of the latch is received. The collar so positioned on the cable that when the cable is pulled by the knob 33 sufficiently to actuate the bellcrank to withdraw the latch bolt 13 out of the path of the jaw 3, the groove 38 is in registry with the path of the notch 36 as the latch 35 in swung in a clockwise direction as viewed in Fig. 3 with resultant locking of the latch bolt in withdrawn position against the bias of the spring 17. The latch 35 is provided with a flange portion 39 which extends above and at right angles to the latch and the front of the trailer carries an air cylinder 40 having a fitting 41 by which it may be connected to the line of the braking system of the trailer which is subject to constant pressure and is known as the "hot" line and further having a piston 42 and a piston rod 43 adapted to be projected outwardly from the cylinder upon admission of pressure to the cylinder and being movable in a path (see Fig. 3) to engage the flange portion 39 and move the latch counterclockwise from its latching position to a position limited by a stop pin 44 at which the notch 36 is disengaged from the groove 38 with resultant release of the latch bolt from its retracted position.

Thus, should the latch bolt 9 fail for any reason when the tractor is backed under the trailer, upon connecting the braking system hoses of the vehicles and the introduction of pressure into the hot line, the safety latch bolt 13 will be automatically released to secure the jaws 2 and 3 in the guideway. Further, if during transit the latch bolt 9 should fail to retain the jaws, the safety latch bolt will still be in position to prevent uncoupling of the vehicles accidentally. Still further, so long as braking pressure is being applied to the trailer, the safety latch bolt can not be locked in released position. The handle 16 provides a convenient additional momentary release for the safety latch bolt but it is not essential to the invention.

Referring next to Figs. 5 and 6, the cable 26 is dispensed with and a rod 45 has one end connected to the end of the bellcrank arm 25 and extends forwardly therefrom through the frame member 29, terminating in a handle portion 46. A latch member 47 is pivotally mounted on the frame member 29 below the rod 45 and is provided with a notch 48 which straddles the rod 45. The rod 45 carries a laterally extending spur 49 adapted to be engaged by the latch member 47 as shown in Fig. 5 when the rod 45 has been pulled forwardly sufficiently to cause the bellcrank to withdraw the latch bolt 13 out of the path of the jaw 7. Also mounted on the front of the trailer frame is a pressure cylinder 50 adapted to be connected to the brake pressure system by a fitting; said cylinder including a piston having a piston rod 51 adapted to engage the flange element 52 of the latch 47 and move it to rod releasing position upon application of braking pressure to the trailer. This modification operates in the same manner and possesses the same advantages as the first described form of the invention. It is an adaptation of the invention for those installations in which it is desired to have the safety latch means at the opposite side of the trailer from the regular or standard latch means comprising the handle 10 and the latch bolt operated thereby. It is obvious that if desired, the rod 45 might be replaced by a short length of cable with a grooved collar as employed in the first described form of the invention.

While the foregoing specification discloses certain presently preferred forms of the invention, such disclosure shall not be deemed to embrace all forms which the invention may take. Therefore, it will be understood that the invention includes as well, all such changes and modifications in the parts and in the construction, combination and arrangement of parts as shall come within the purview of the appended claims.

I claim:

1. The combination with a coupling means for a tractor and trailer having a fluid pressure braking system; said coupling means including an upwardly projecting king pin on the tractor movable along a guiding slot on the trailer into and out of locking engagement with a pair of king pin engaging jaws slidable in the slot and a manually releasable bolt extending from the slot from one side thereof and effective to retain the jaws in the slot in king pin engaging position, of means for preventing the accidental or unintended uncoupling of the tractor and trailer by failure or malfunction of the manually releasable bolt; said means comprising a latch bolt mounted for slidable movement through the side of the guiding slot for the king pin and jaws at the side opposite the manually releasable bolt and slightly forward thereof, spring means normally effective to maintain said latch bolt projecting into the guiding slot, means for moving said latch bolt to an inoperative position out of the path of the jaws as they traverse the guiding slot, a manually operable latch operable to lock said latch bolt moved out of said path, and devices connected to the portion of the braking system of the tractor and trailer which is constantly subject to pressure effective upon energization of said constantly energized portion of the braking system to release said manually operable latch with resultant release of said latch bolt to be returned to locking position by said spring and to maintain said latch released so long as said portion of said braking system remains energized.

2. A tractor and trailer uncoupling preventing means as claimed in claim 1 in which said means for moving said latch bolt to inoperative position comprises a bell crank having one arm thereof connected to said latch bolt and the other arm thereof connected to one end of a cable; said cable extending thence through the front end of the trailer frame structure and carrying a collar engageable by said latch means, and in which said latch releasing means comprises a cylinder and piston and a piston rod connected to said piston and engaging said latch, and conduit means affording connection of said cylinder with the portion of the braking system which is constantly subject to pressure.

3. A tractor and trailer uncoupling preventing means as claimed in claim 1 in which said cable projects through an opening at the front end of the trailer at the side thereof adjacent the manual means for releasing the bolt normally effective to lock the jaws and king pin in the guiding slot, and in which said latch comprises an arm pivoted at one end and having the opposite end disposed in the path of said piston rod as it is projected out of said cylinder; said latch having a notch in the edge thereof which is adjacent said cylinder effective to engage said collar.

4. A tractor and trailer uncoupling preventing means as claimed in claim 1 in which said means for latching and releasing said latch bolt comprises a bell crank having one arm thereof attached to said latch bolt and the other arm thereof attached to a rod extending forwardly through an opening in the front end of the trailer frame, a latch engaging spur on said rod, a pivoted latch member on the trailer frame operable to engage said spur to hold said rod in a position maintaining said latch bolt retracted, and a cylinder and piston means connected to a portion of the braking system normally subject to constant pressure and effective in response to such pressure to move said latch to rod disengaging position and to prevent the re-engagement of said latch with said rod so long as said cylinder and piston are subject to braking system pressure.

References Cited in the file of this patent

UNITED STATES PATENTS

| 1,641,354 | Reid | Sept. 6, 1927 |
| 2,258,432 | Winn | Oct. 7, 1941 |
| 2,468,705 | Price | Apr. 26, 1949 |
| 2,515,574 | Starr | July 18, 1950 |
| 2,528,076 | Plaxco | Oct. 31, 1950 |